(12) United States Patent
Yamada et al.

(10) Patent No.: US 7,042,178 B2
(45) Date of Patent: May 9, 2006

(54) MOTOR DRIVING APPARATUS

(75) Inventors: Yuuichi Yamada, Yamanashi (JP);
Shigeki Hanyu, Yamanashi (JP);
Mamoru Yaeshima, Hadano (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/859,356

(22) Filed: Jun. 3, 2004

(65) Prior Publication Data

US 2004/0245951 A1  Dec. 9, 2004

(30) Foreign Application Priority Data

Jun. 6, 2003  (JP) .............................. 2003/162786

(51) Int. Cl.
*H02P 1/26* (2006.01)
*H02P 1/42* (2006.01)
*H02P 3/18* (2006.01)
*H02P 5/28* (2006.01)
*H02P 7/36* (2006.01)

(52) U.S. Cl. ...................... 318/376; 318/722; 318/727; 318/362; 318/801; 318/34

(58) Field of Classification Search ................ 318/376, 318/727, 362, 801, 722; 363/34
See application file for complete search history.

(56) References Cited

U.S. PATENT DOCUMENTS

| 4,426,610 | A | * | 1/1984 | Kawada et al. | 318/798 |
| 4,434,393 | A | * | 2/1984 | Kobari et al. | 318/757 |
| 4,733,146 | A | * | 3/1988 | Hamby | 388/847 |
| 5,034,669 | A | * | 7/1991 | Sako et al. | 318/376 |
| 6,333,611 | B1 | * | 12/2001 | Shibuya et al. | 318/370 |
| 6,422,351 | B1 | * | 7/2002 | Tajima et al. | 187/290 |
| 6,439,347 | B1 | * | 8/2002 | Suga et al. | 187/290 |

FOREIGN PATENT DOCUMENTS

| JP | 04-322107 | 11/1992 |
| JP | 5-274049 | 10/1993 |
| JP | 11-299290 | 10/1999 |
| JP | 2000-141440 | 5/2000 |
| JP | 2000-236679 | 8/2000 |

* cited by examiner

OTHER PUBLICATIONS

Notice of Grounds of Rejection (Office Action) dated Jun. 14, 2005.

*Primary Examiner*—David Martin
*Assistant Examiner*—Erick Glass
(74) *Attorney, Agent, or Firm*—Staas & Halsey LLP

(57) ABSTRACT

A motor driving apparatus including a regeneration control function and a power storage device for accumulating a regenerative current and for supplying an inverter section with electric power during acceleration. The inverter section is connected to a converter section by a DC link to which regeneration start detecting means and the power storage device are connected. When the regeneration start detecting means detects that a voltage at the DC link reaches a regeneration control start voltage, a controller controls switching elements and starts regeneration control. The regenerative current is accumulated in the capacitor through a diode. When a motor is in a power running state, the switching elements are turned on to apply the voltage at the power storage device to the DC link, and the charged power is utilized for motor acceleration. At that time, the regeneration control start voltage for the regeneration start detecting means is made higher, thereby preventing regeneration control from being activated due to application of the capacitor's voltage. Not only the regenerative current is effectively utilized by the power storage device, but also the regeneration control function can be utilized.

10 Claims, 4 Drawing Sheets

MOTOR DRIVING APPARATUS

BACKGROUND OF THE INVENTION

1. Field of the Invention

The present invention relates to a motor driving apparatus, and more particularly to a motor driving apparatus which stores regenerative electric power and discharges the stored power for use as a motor drive current in an accelerating drive of the motor.

2. Description of Related Art

In a motor driving apparatus, a large drive current for acceleration is caused to flow in motor acceleration (power ruining) period, and a regenerative current is generated in deceleration period. Thus, the motor driving apparatus must be designed by taking into account of a peak current in motor acceleration (power running) period, resulting in increased size and cost of the apparatus. The regenerative current generated in deceleration period is thermally consumed by a regeneration resistor, resulting in wasted energy loss. On the other hand, there is known a motor driving apparatus comprising regeneration control means for feeding a regenerative current back to an AC power source through a converter section, thereby avoiding wasteful consumption of the regenerative current.

For the purpose of effectively utilizing the regenerative current and leveling the drive current, there is another known invention (see JP 2000-141440A) comprising a capacitor connected to a DC link through which a converter section (rectifier circuit) for converting AC power to DC power is connected to an inverter section for converting DC power to AC power. In acceleration period, electric power stored in the capacitor is supplied to the inverter section, whereas a regenerative current is stored in the capacitor in deceleration period. Thus, the drive current is leveled and a wasteful consumption of regenerative current is prevented.

In the aforementioned motor driving apparatus having regenerative control function for feeding regenerative current back to AC power source, a voltage at the DC link connecting the converter section with the inverter section is detected, and regeneration control is started when the voltage at the DC link increases due to regenerative current to a predetermined regeneration control start voltage.

On the other hand, in a motor driving apparatus of the type as described in JP 2000-141440A, which comprises the capacitor such as condenser for storing the regenerative current and which operates, during motor acceleration, to discharge the power stored in the capacitor to supply a motor drive current through the inverter, the charging voltage of the capacitor becomes higher than the regeneration control start voltage for regeneration control function and hence the regeneration control operation is started, when the charging voltage is applied to the DC link to attempt to discharge the power from the capacitor upon motor acceleration. For this reason, the capacitor cannot be added to a motor driving apparatus having the regenerative control function.

Capacitance of a capacitor can be made smaller using a higher voltage for charging the capacitor to the same level of energy, thereby enabling to prepare an additional circuit including charging/discharging circuits with reduced size and cost. Thus, there is a merit in adding the capacitor to the motor control apparatus.

SUMMARY OF THE INVENTION

The present invention provides a motor driving apparatus having a regenerative control function of feeding a regenerative electric power to an AC power source in an decelerating drive of the motor and also a power storage device for storing the regenerative electric power and discharging the stored electric power in an accelerating drive of the motor.

According to one aspect of the present invention, a motor driving apparatus comprises: a converter section for rectifying and converting an alternating current from the AC power source into a direct current; an inverter section connected to an AC motor, for converting the converted direct current into an alternating current to drive the AC motor; a DC link for connecting the converter section and the inverter section; a power storage device connected to the DC link, for charging a capacitor with regenerative electric power in a decelerating drive of the AC motor and discharging the electric power stored in the capacitor to be supplied to the DC link in an accelerating drive of the AC motor; and regeneration control means for detecting a voltage of the DC link and performing a regeneration control of feeding the regenerative electric power to the AC power source when the detected voltage of the DC link is equal to or higher than a regeneration control start voltage, the regeneration control means having regeneration control start voltage altering means for altering the regeneration control start voltage to avoid the regeneration control when the electric power stored in the capacitor is supplied to the DC link. With the above arrangement, the regeneration control is disabled in the accelerating drive of the AC motor even if a high discharging voltage is applied from the capacitor of the power storage device to the DC link.

According to another aspect of the present invention, a motor driving apparatus comprises: a converter section for rectifying and converting an alternating current from the AC power source into a direct current; an inverter section connected to an AC motor, for converting the converted direct current into an alternating current to drive the AC motor; a DC link for connecting the converter section and the inverter section; a power storage device connected to the DC link, for charging a capacitor with regenerative electric power in a decelerating drive of the AC motor and discharging the electric power stored in the capacitor to be supplied to the DC link in an accelerating drive of the AC motor; and regeneration control means for detecting a voltage of the DC link and performing a regeneration control of feeding the regenerative electric power to the AC power source when the detected voltage of the DC link is equal to or higher than a regeneration control start voltage, the regeneration control means having altering means for altering the regeneration control start voltage to be a voltage higher than a voltage of the electric power supplied from the power storage device to the DC link when the power storage device is connected to the DC link.

Means for operating the altering means may be provided at connecting means for connecting the power storage device to the DC link.

According to still another aspect of the present invention, the power storage device comprises: a converter section for rectifying and converting an alternating current from the AC power source into a direct current; an inverter section connected to an AC motor, for converting the converted direct current into an alternating current to drive the AC motor; a DC link for connecting the converter section and the inverter section; regeneration control means for detecting a voltage of the DC link and performing a regeneration control of feeding the regenerative electric power to the AC power source when the detected voltage of the DC link is equal to or higher than a regeneration control start voltage;

and a power storage device connected to the DC link, for charging a capacitor with regenerative electric power in a decelerating drive of the AC motor and discharging the electric power stored in the capacitor, the power storage device having electric power supply means for supplying the stored electric power to the DC link at a voltage lower than the regeneration control start voltage in an accelerating drive of the AC motor.

The electric power supply means may be constituted by a constant-voltage circuit, such as a series regulator or a switching regulator, for outputting a constant voltage. Further, the electric power supply means may comprise means for slowly increasing an output voltage at a start of discharging the stored electric power.

The electric power supply means may comprise a switching element for supplying the electric power stored in the capacitor to the DC link and a control circuit for controlling the switching element. In this case, the control circuit may detect the DC link voltage and control the switching element to be turned off when the detected voltage is equal to or higher than a first set voltage lower than the regeneration control start voltage, and to be turned on when the detected voltage is equal to or lower than a second set voltage which is lower than the first set voltage. The switching element may connected to the DC link through an inductance.

DETAILED DESCRIPTION

Figure 1:
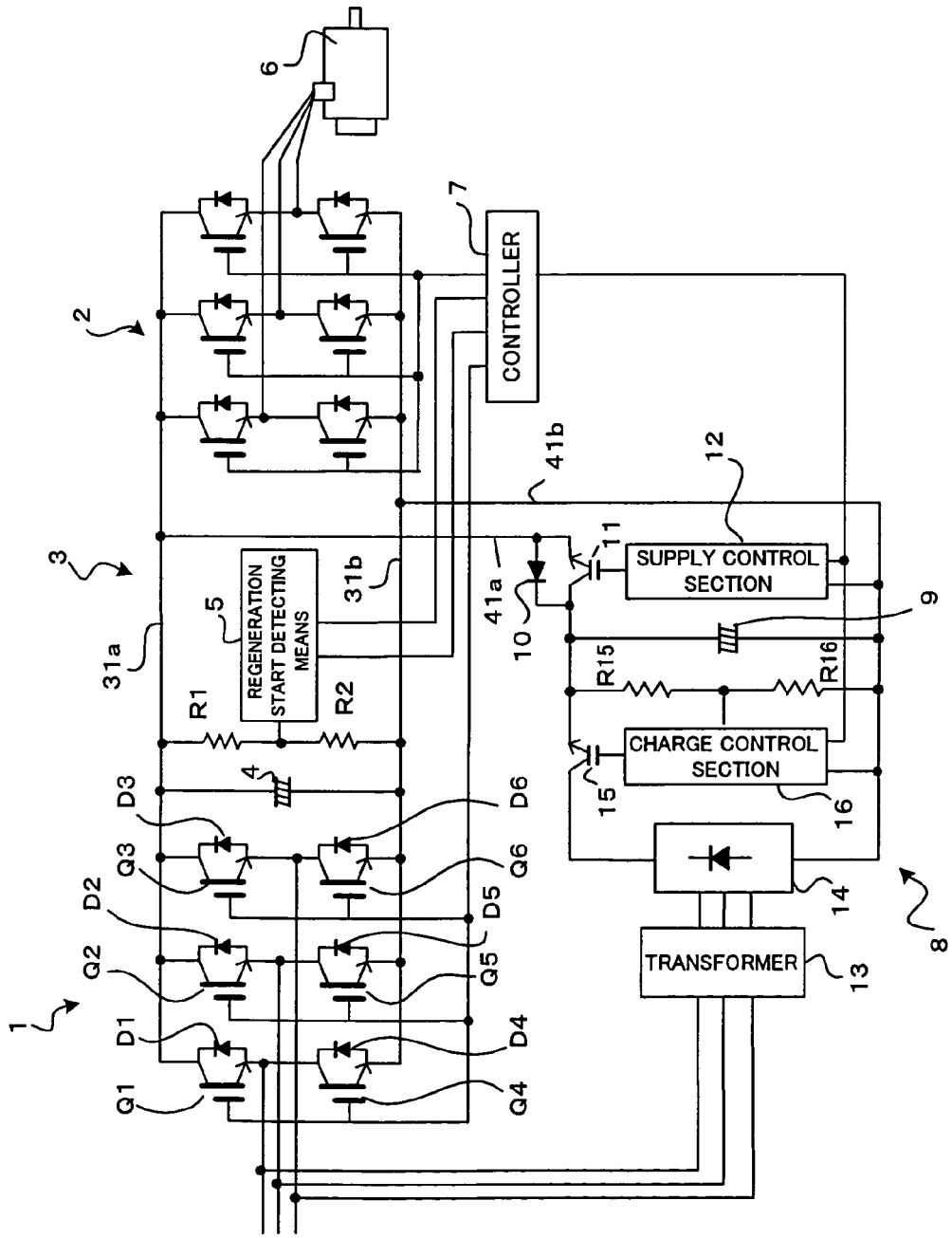
FIG. 1 is a block circuit diagram of a motor driving apparatus according to a first embodiment of the present invention.

Referring to FIG. 1, a motor driving apparatus according to a first embodiment of the present invention includes a converter (rectifier circuit) section 1 for converting AC power from a three-phase AC power source to DC power, and an inverter section 2 for converting DC power back to AC power and for driving an AC motor 6. The converter section 1 is connected with the inverter section 2 by a DC link 3, and DC current is supplied from the converter section 1 to the inverter section 2. Reference numeral 4 denotes a smoothing capacitor for smoothing the DC output of the converter section 1.

The DC link 3 is provided with regeneration start detecting means 5 that includes resistors R1 and R2 for dividing the DC voltage of the DC link 3 and that detects a regeneration control start voltage from the divided voltage. The converter section 1 comprises diodes D1–D6 serving as a rectifier circuit for converting three-phase AC power to DC power, and switching elements Q1–Q6 for feeding regenerative currents back to the AC power. Each of the switching elements Q1–Q6 is connected in parallel to a corresponding one of the diodes D1–D6. The switching elements Q1–Q6 are controlled to be turned on and off by means of a controller 7, mentioned later, whereby a regenerative current is fed back to the AC power source.

In the inverter section 2, switching elements are turned on and off under the control of the controller 7, whereby electric power is supplied to the motor 6 to drive the same.

The controller 7, which is a controller in the motor driving apparatus, on/off controls the switching elements of the inverter section 2 to drive the motor 6 in accordance with a command supplied from an upper controller such as a numerical controller, not shown, for controlling the motor driving apparatus. Further, the controller 7 on/off controls the switching elements Q1–Q6 of the converter section 1 to thereby feed the regenerative current back to the three-phase power when a regeneration control start command is output from the regeneration start detecting means 5. In this embodiment, the regeneration start detecting means 5 cooperates with the controller 7 and the switching elements Q1–Q6 of the converter section 1 to constitute regeneration control means.

The converter section 1, inverter section 2, DC link 3, controller 7, etc. are the same as those of a known motor driving apparatus, and therefore, a detailed explanation thereon will be omitted. The present invention is characterized by the provision of a power storage device 8 connected to the DC link 3, and the later-mentioned regeneration control start voltage alteration means that is provided in the regeneration start detection circuit 5.

The power storage device 8 is constituted by electric power supply means, which includes a capacitor 9 formed by a capacitor or the like, a diode 10 through which the regenerative current flows from the DC link 3 into the capacitor 9, a switching element 11 for supplying electric power charged in the capacitor 9 to the inverter section 2 through the DC link 3, and supply control section 12 for controlling the switching element 11; a transformer 13 for stepping-up three-phase AC power; a converter (rectifier circuit) 14 for converting the stepped-up voltage to DC power; a switching element 15 for charging the capacitor 9 up to a predetermined charge voltage with the converted DC power; a charge control section 16 for on/off controlling the switching element 15; and resistors R15, R16 for dividing and detecting a charge voltage of the capacitor 9.

The charge control section 16 and the supply control section 12 of the power storage device 8 are connected with the controller 7 of the motor driving apparatus, and operate to start charge control and supply control in response to a signal supplied from the controller 7.

AC power is converted to DC power in the converter section 1. In response to a command supplied from the upper controller, not shown, the controller 7 on/off controls the switching elements of the inverter section 2 to thereby convert the DC power back to AC power and drive the motor 6. When the motor 6 is decelerated, a regenerative current is generated, and the DC link voltage increases. When the voltage divided by the resistors R1, R2 exceeds the regeneration control start voltage, a regeneration control start signal is output from the regeneration start detecting means 5 to the controller 7 which on/off controls the switching elements Q1–Q6 of the converter section 1, thereby feeding the regenerative current back to the three-phase AC power.

The regenerative current flows through the diode 10 and charges the capacitor 9. When the deceleration of the motor is terminated, the controller 7 sends a control start signal to the charge control section 16. In response to this, the charge control section 16 turns off the switching element 15. When the switching element 15 is in an OFF state, electric current flows from the converter (rectifier circuit) 14 into the capacitor 9, whereby the capacitor 9 is charged. The charge voltage of the capacitor 9 is divided by the resistors R15, R16 constituting voltage detection means. When detecting based on the divided voltage that the charge voltage reaches a preset voltage, the charge control section 16 turns off the switching element 15. Thus, the capacitor 9 is charged up to a predetermined voltage that is set beforehand. When accelerating the motor, the controller 7 outputs a predetermined pulse signal to the supply control section 12 which in turn turns on the switching element 11 for a time period corresponding to a pulse width. When the switching element 11 is in an ON state, electric power stored in the capacitor 9 is supplied, as motor drive current, through the switching element 11 to the DC link 3 and the inverter section 2, whereby the motor 6 is acceleratedly driven.

Thereafter, the aforementioned operation is continued as long as the motor drive control is performed.

As explained above, the switching element 11 is turned off during the motor acceleration, so that the voltage of the capacitor 9 is applied to the DC link 3. On the other hand, the capacitor 9 is usually charged up to a voltage higher than the regeneration control start voltage. This results in a problem that a voltage higher than the regeneration control start voltage is detected by the regeneration start detecting means during the motor acceleration and the regeneration control is started. To obviate this, in this embodiment, the regeneration start detecting means 5 is provided with regeneration control start voltage alteration means for inhibiting or avoiding the regeneration control operation, even if the switching element 11 is turned on and hence the charge voltage of the capacitor 9 is applied to the DC link during the motor acceleration.

Figure 2:
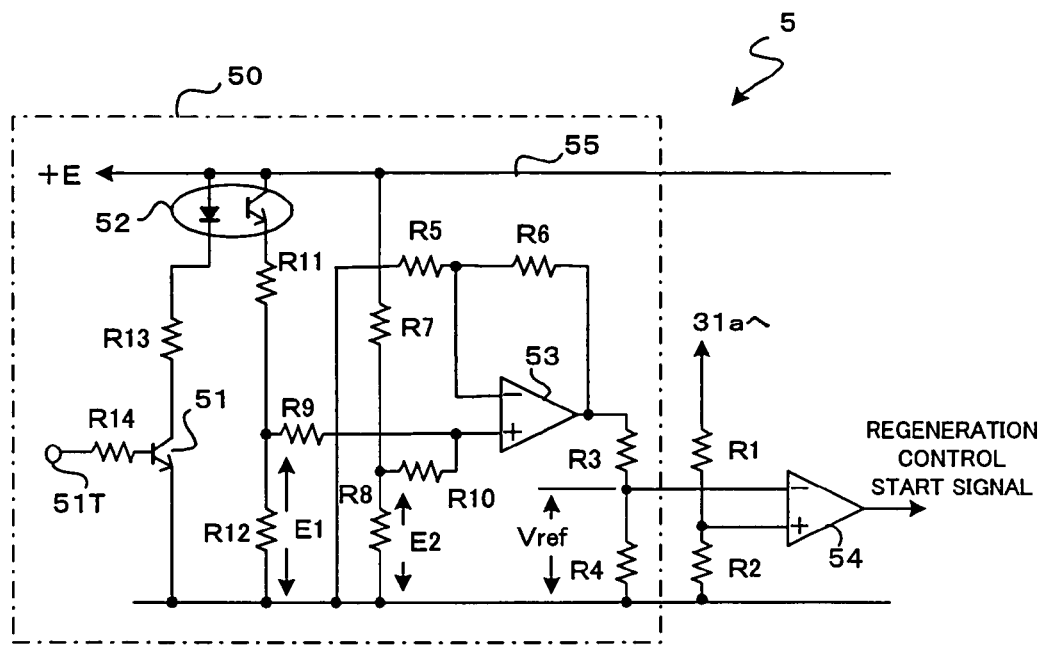
FIG. 2 is a detailed block circuit diagram of regeneration start detecting means in the first embodiment.

FIG. 2 is a detailed block circuit diagram showing the regeneration start detecting means 5 and the resistors R1, R2 for dividing the voltage at the DC link 3 in this embodiment.

In FIG. 2, reference numeral 51 denotes a switching element; 52, photocoupler; 53, an operational amplifier that cooperates with resistors R5, R6, R9 and R10 to form an adder circuit; and 54, a comparator.

The switching element 51 is connected through a resistor R13 to a light emission element of the photocoupler 52. A series circuit of the switching element 51, the resistor R13, and the light emission element of the photocoupler 52 is connected to a line 55 to which a voltage of +E is applied. A control terminal (base) of the switching element 51 is connected to the controller 7 through a resistor R14.

A photodetector of the photocoupler 52 is connected in series with resistors R11 and R12 which cooperate with the photodetector to form a series circuit to which the voltage of +E is applied. The voltage +E is also applied to a series circuit of resistors R7 and R8. A voltage E1 obtained by dividing the voltage +E by the photodetector of the photocoupler 52 and the resistors R11, R12 is supplied through the resistor R9 to one of terminals of the operational amplifier 53. Supplied through the resistor R10 to the same terminal of the amplifier 53 is a voltage E2 obtained by dividing the voltage +E by the resistors R7, R8. A voltage obtained by dividing the output of the operational amplifier 53 by the resistors R5, R6 is supplied to another terminal of the amplifier 53 which serves as an adder circuit for adding the input voltages E1, E2 together.

The output of the operational amplifier 53 is divided by resistors R3, R4, and the resultant voltage is supplied to one of terminals of the comparator 54. Supplied to another terminal of the comparator 54 is a voltage obtained by dividing a voltage at the DC link 3 by the resistors R1, R2.

In this embodiment, the switching element 51 cooperates with the photocoupler 52, the operational amplifier 53 serving as adder circuit, and the resistors R3–R14 to constitute regeneration control start voltage alteration means 50, and the comparator 54 constitutes regeneration start voltage detection means. In a known regeneration detection means, the regeneration control start voltage alteration means 50 is not provided, and a voltage provided by dividing the voltage at the DC link 3 by the resistors R1, R2 and a predetermined regeneration start voltage set beforehand are supplied to the comparator 54. Thus, this embodiment is characterized by the provision of the regeneration control start voltage alteration means 50.

When the switching element 51 is turned off, the light emission element of the photocoupler 52 does not emit light, and hence the photodetector remains turned off. Therefore, the voltage E1 across the resistor R12 to be obtained by dividing the voltage +E is at zero, so that only the voltage E2 provided by dividing the voltage +E by resistors R7 and R8 is supplied to and output from the operational amplifier 53 serving as adder circuit. The output from the operational amplifier 53 is divided by the resistors R3 and R4. The divided voltage, i.e., the regeneration control start voltage Vref, is compared in the comparator 54 with a voltage that is provided by dividing the voltage at the DC link 3 by the resistors R1, R2. When the divided voltage at the DC link 3 exceeds the regeneration control start voltage Vref, a regeneration control start signal is output from the comparator 54, so that regeneration control is performed.

During power running, on the other hand, the controller 7 outputs a signal for turning on the switching element 11 to discharge electric power of the capacitor 9, and outputs a high-level signal to the switching element 51. Thus, the photocoupler 51 is operated to thereby generate the voltage E1 across the resistor R12. The voltage E1 is added in the operational amplifier 53, serving as adder circuit, to a voltage E2 provided by dividing the voltage +E by the resistors R7, R8. The resultant voltage E1+E2 is output from the amplifier 53, resulting in the increase in the regeneration control start voltage Vref provided by dividing the voltage E1+E2 by the resistors R3, R4. Since the regeneration control start voltage Vref increases, the regeneration control start signal is not output from the comparator 54, even if the switching element 11 is turned on and the charge voltage of the capacitor 9 is applied to the DC link 3 during the motor acceleration. Thus, the regeneration control is prevented from being enabled during the power running.

The aforementioned regeneration control start voltage alteration means 50 for shifting the regeneration control start voltage Vref is constituted by the switching element 51, the photocoupler 52, the adder circuit formed by the operational amplifier 53, and the like. Alternatively, there may be used two regeneration control start voltages VrefH and VrefL that are determined beforehand to have different values and serve as comparison voltages to be supplied to the comparator 54, and switching means for supplying either one of these two voltages to the comparator 54. During the power running, the switching means responds to a signal supplied from the controller 7 to input the higher regeneration control start voltage VrefH to the comparator 54, in which the voltage VrefH is compared with the divided voltage provided by the resistors R1 and R2, whereby the execution of the regeneration control function is abandoned.

Figure 3:
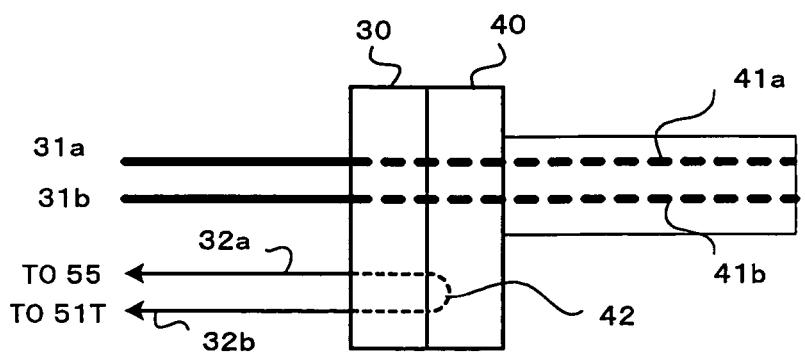
FIG. 3 is a view for explaining connection means in a second embodiment of the present invention.

In the foregoing first embodiment, the controller 7 switches the regeneration control start voltage Vref. Alternatively, the regeneration control start voltage Vref may be increased automatically when the power storage device 8 is attached to the motor driving apparatus. FIG. 3 is a view for explaining essential part of a second embodiment to which such automatic voltage shifting is applied.

FIG. 3 is a view for explaining connection means for connecting the DC link 3 with the power storage device 8. Reference numeral 30 denotes a connector on the side of the motor driving apparatus, and reference numeral 40 denotes a connector on the side of the power storage device 8. Connected to the connector 30 are lines 31a, 31b of the DC link 3 and lines 32a, 32b. The line 32a is connected to a line 55 (at voltage +E) of the regeneration start detecting means 5 shown in FIG. 2, and the line 32b is connected to the control terminal 51T of the switching element 51 of the regeneration start detecting means 5.

Connected to the connector 40 are lines 41a, 41b of the power storage device that are connected individually to the lines 31a, 31b of the DC link 3. The connector 40 includes a line 42 that short-circuits the lines 32a, 32b of the connector 30.

When the power storage device 8 is connected the motor driving apparatus through the connectors 30 and 40, the lines 31a, 31b of the DC link 3 are connected to the lines 41a, 41b of the power storage device 8, and the lines 32a, 32b are connected through the line 42 to each other. Therefore, the voltage +E is applied to the control terminal 51T of the switching element 51 of the regeneration start detecting means 5, to turn on the switching element 51, and hence the regeneration control start voltage Vref increases automatically as previously mentioned. Even if the charge voltage of the capacitor 9 is applied to the DC link 3 during the motor acceleration or the like, the regeneration control function is not activated by the charge voltage.

Figure 4:
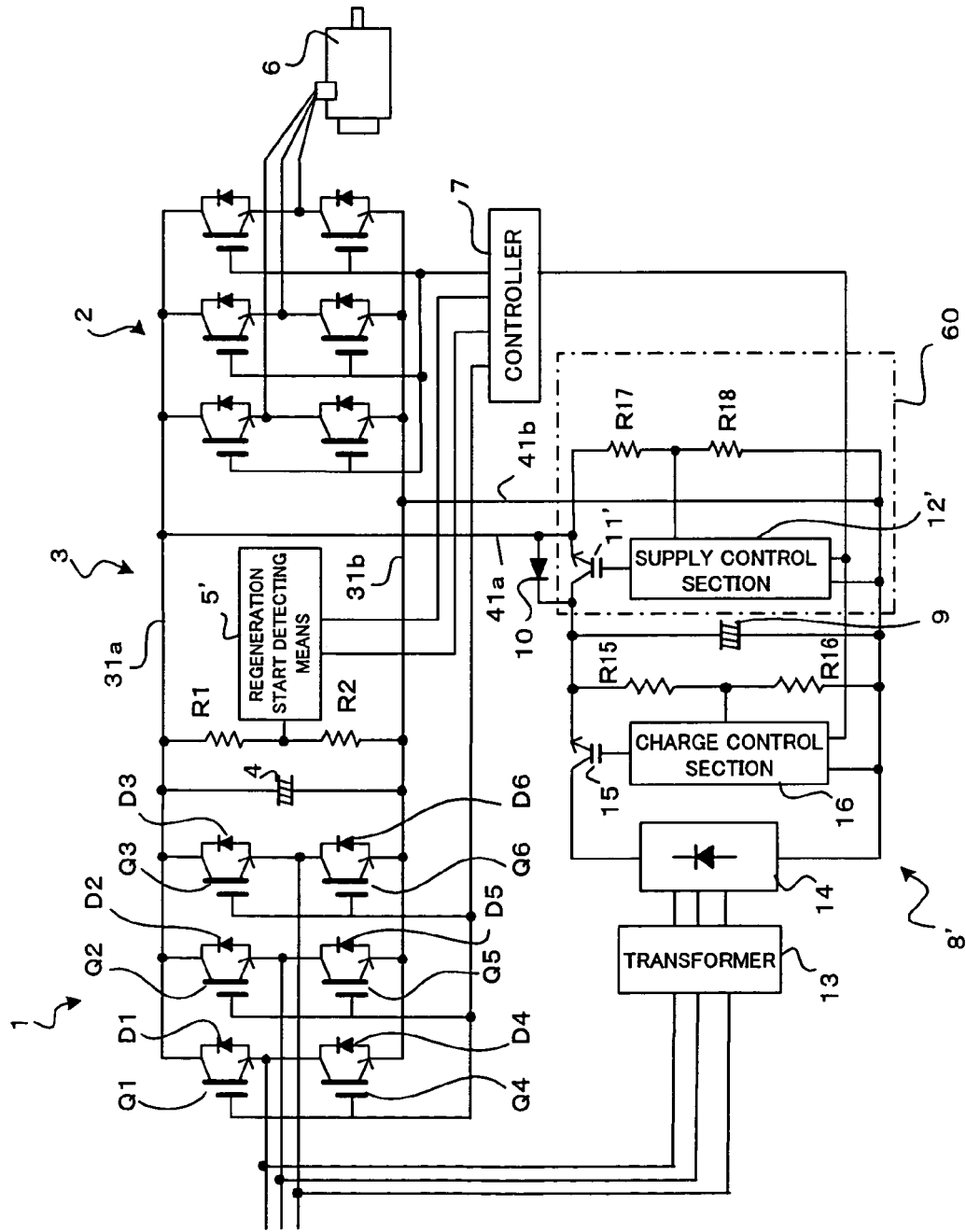
FIG. 4 is a block circuit diagram of a motor driving apparatus according to a third embodiment of the present invention.

FIG. 4 is a block circuit diagram showing a third embodiment of the present invention.

In the foregoing first and second embodiments, the regeneration control function is disabled by shifting the regeneration control start voltage to a value high enough to prohibit the regeneration control function when the charge voltage of the capacitor of the power storage device is applied to the DC link 3 during the motor acceleration. On the contrary, in the third embodiment, the regeneration control function is disabled by controlling the voltage at the capacitor 9 to a voltage lower than the regeneration control start voltage when the capacitor's voltage is discharged to the DC link.

As compared to the first embodiment shown in FIG. 1, the motor driving apparatus of FIG. 4 differs in that it comprises regeneration start detecting means 5' and a power storage device 8'. Specifically, a discharge circuit 60 of the device 8' for discharging electric power stored in the capacitor 9 to the DC link 3 includes power supply means, a supply control section 12', which is different in construction from the supply control section 12. Another difference is in that a transistor which does not serves as a switching element but performs amplification is used to constitute an element 11' for discharging electric power of the capacitor 9 of the power supply means to the DC link.

The regeneration start detecting means 5' different from that of the first embodiment is designed similar to a known one to output the regeneration control start signal when the divided voltage obtained by dividing the voltage at the DC link 3 by resistors R1, R2 reaches the preset regeneration control start voltage. Specifically, the detection means 5' is constituted by the comparator 54 shown in FIG. 2 which is supplied at its input terminals with the divided voltage by the resistors R1, R2 and the reference voltage, i.e., the preset regeneration control start voltage.

The supply control section 12' of the power supply means in the discharge circuit 60 is different from the first embodiment in that it is constituted by a constant-voltage circuit to provide a predetermined constant output, as will be described later.

Similar to the first embodiment, in the motor driving apparatus of the third embodiment, the converter section 1 converts AC power to DC power, and the inverter section 2 converts the DC power back to AC power and drives the motor 6. During the motor driving, a regenerative current is generated when the motor 6 is decelerated. When the divided voltage at the resistors R1, R2 exceeds the regeneration control start voltage as the DC link voltage increases, the regeneration control start signal is output from the regeneration start detecting means 5, and the controller 7 on/off controls the switching elements Q1–Q6, thereby performing the regeneration control.

The regenerative current passes through the diode 10 and charges the capacitor 9. When the motor deceleration is finished, the controller 7 transmits the control start signal to the charge control section 16. In response to the signal, the charge control section 16 turns on the switching element 15. When the switching element 15 is in an ON state, electric current from the converter (rectifier circuit) 14 flows into the capacitor 9 to charge the same. When the charge voltage of the capacitor 9 reaches the preset voltage, the charge control section 16 having the resistors R15, R16 serving as voltage detection means and dividing the charge voltage detects that the charge voltage reaches the preset voltage, and turns off the switching element 15. Thus, the capacitor 9 is charged up to the preset voltage. In the case of motor acceleration, the controller 7 outputs predetermined pulse signals to the supply control section 12' which in turn controls the transistor 11' according to the pulse width, whereby the output voltage (i.e., the voltage at the DC link 3) is controlled to a voltage lower than the regeneration control start voltage for the regeneration start detecting means 5'.

Figure 5:
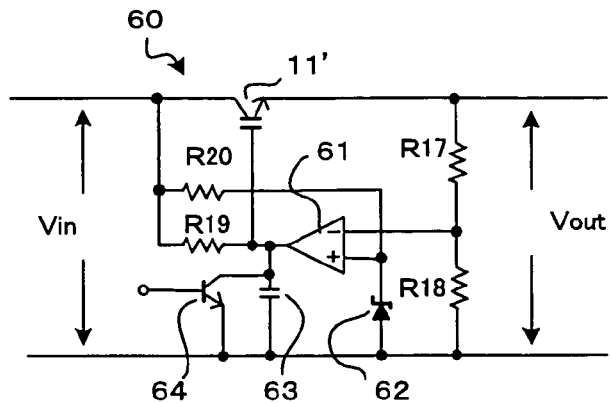
FIG. 5 is a detailed block circuit diagram of a discharge circuit in the third embodiment.

FIG. 5 shows an example in which a constant-voltage circuit is used as the supply control section 12' of the power supply means of the discharge circuit 60 in the third embodiment. In this example, the constant-voltage circuit is constituted by a series regulator.

In FIG. 5, symbol Vin denotes input voltage of the discharge circuit 60, which is also the charge voltage of the capacitor 9. Symbol Vout denotes output voltage of the discharge circuit 60, which is also the voltage at the DC link. A differential amplifier 61 inputs the divided or detected voltage at resistors R17 and R18 serving as means for detecting the output voltage Vout, and the preset voltage provided by a Zener diode 62. The output of the differential amplifier 61 is supplied to the base of the transistor 11' to control the transistor 11' such that the output voltage Vout is maintained at a constant voltage lower than the regeneration control start voltage for the regeneration start detecting means 5'.

In this case, the output voltage Vout is a constant voltage as shown by the following formula (1) where Vz denotes the voltage provided by the Zener diode which may be set at a voltage lower than the regeneration control start voltage.

$$Vout = Vz \times (R1+R2)/R2 \qquad (1)$$

In the third embodiment, if the charge voltage, which is high, of the capacitor 9 is applied to the DC link 3, a large rush current flows through the smoothing capacitor 4 for smoothing the DC voltage supplied from the converter section 1. Thus, a capacitor 63 is connected to the output terminal of the differential amplifier 61 in parallel with a switching element 64, thereby increasing the output voltage Vout of the discharge circuit 60 to the extent that the starting performance of the motor 6 is not affected. The output voltage Vout of the discharge circuit 60 is controlled to slowly rise with a time constant determined by the capacitor 63 and a resistor R19. In this third embodiment, the supply control means 12' is constituted by the differential amplifier 61, Zener diode 62, capacitor 63, switching element 64, etc.

The switching element 64 is normally in an ON state, and hence the output of the differential amplifier 61 is maintained at a low level, so that the transistor 11' is in an OFF state. When the motor is accelerated or in the power running mode, the switching element 64 is supplied from the controller 7 with a low-level pulse of a predetermined width, and is hence in an OFF state. As a result, the voltage on the output side of the differential amplifier 61 or the base voltage of the transistor 11' increases with the time constant determined by the capacitor 63 and the resistor R19, and the constant voltage Vout lower than the regeneration control start voltage for the regeneration start detecting means 5' is applied from the discharge circuit 60 to the DC link 3 under the action of the series regulator, as described above.

A switching regulator or the like, other than the series regulator used in the foregoing embodiment, may be used as the constant voltage circuit of the discharge circuit 60 for supplying the DC link 3 with the constant voltage Vout lower than the regeneration control start voltage for the regeneration start detecting means 5'.

Figure 6:
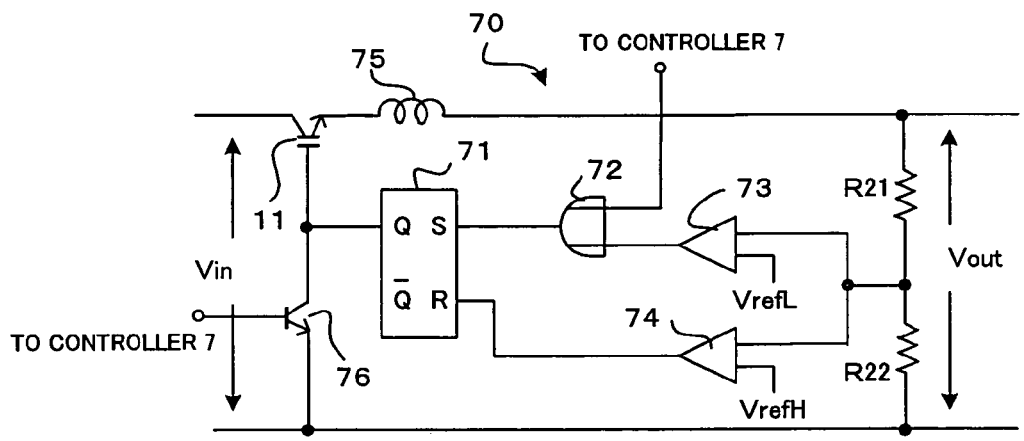
FIG. 6 is a detailed block circuit diagram of a discharge circuit in a fourth embodiment of the present invention.
Figure 7:
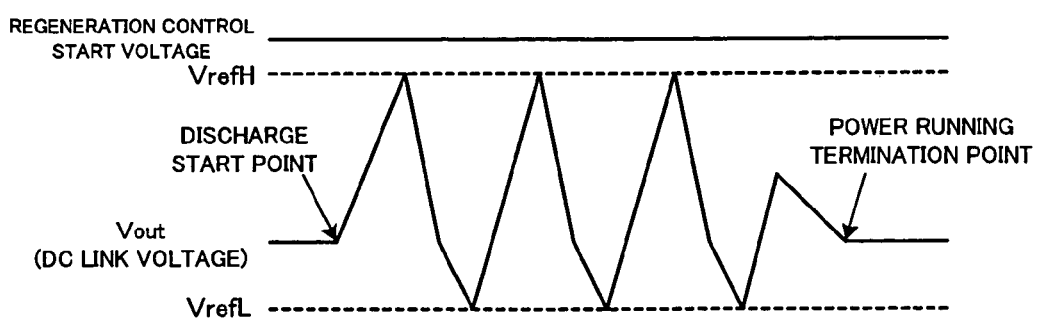
FIG. 7 is a view for explaining operation of the discharge circuit of the fourth embodiment.

FIG. 6 is a block circuit diagram of a discharge circuit in a fourth embodiment of the present invention, and FIG. 7 is a view for explaining the operation of the discharge circuit. In the fourth embodiment, a discharge circuit 70 shown in FIG. 6 is used instead of the discharge circuit 60 shown in FIG. 4. During the motor acceleration (power running), the fourth embodiment operates to stop the discharging of the capacitor 9 before the voltage at the DC link 3 reaches the regeneration control start voltage and to start the discharging when the voltage at the DC link 3 decreases to a predetermined voltage.

In the discharge circuit 70 shown in FIG. 6, symbol Vin denotes the input voltage of the discharge circuit 70 and is also the charge voltage of the capacitor 9. Symbol Vout denotes the output voltage of the discharge circuit 70 and is also the voltage at the DC link 3. Reference numeral 71 denotes a flip-flop; 72, an OR circuit; 73 and 74, comparators; 75, inductance; and 76, a transistor. In this embodiment, the flip-flop 71 cooperates with the OR circuit 72, comparators 73, 74, inductance 76, transistor 76, etc. to constitute the supply control section 12 which in turn cooperates with the switching element 11 to constitute power supply means.

The comparators 73, 74 are supplied at respective one terminals with the divided voltage provided by dividing the output voltage (the voltage at the DC link 3) Vout by resistors R21, R22. The comparator 73 is supplied at another terminal with a preset low-level reference voltage VrefL for start of discharge, and outputs a signal when the divided voltage of the output voltage Vout at the resistors R21, R22 decreases to equal to or less than the reference voltage VrefL. The comparator 74 is supplied at another terminal with a preset reference voltage VrefH for discharge stop, which is lower than the regeneration control start voltage and higher than the reference voltage VrefL input to the comparator 73. The comparator 74 outputs an output signal when a detection voltage increases to greater than the reference voltage VrefL, the detection voltage being detected and provided by dividing the output voltage Vout by the resistors R21, R22 constituting voltage detection means.

The output of the comparator 73 is supplied to the OR circuit 72 which is also supplied with a signal that is output from the controller 7 upon start of the motor acceleration (power running). The output of the OR circuit 72 is supplied to the set terminal of the flip-flop 71 which is supplied at its reset terminal with the output of the comparator 74. The set output of the flip-flop 71 is supplied to the switching element 11.

When the motor is in the power running mode (accelerated), a discharge start command to discharge electric power of the capacitor 9 is output from the controller 7 to the discharge circuit 70, whereby the flip-flop 71 is set through the OR circuit 72 to change the transistor 76 from an ON state to an OFF state. As a result, the switching element 11 is turned on, whereby the discharging of the capacitor 9 is started. Since the inductance 75 is disposed in the discharge circuit extending to the DC link 3, the voltage at the DC link 3 which is the output voltage Vout slowly rises as shown in FIG. 7. When the voltage provided by dividing the voltage Vout of the DC link 3 increases to equal to or larger than the reference voltage VrefH, the comparator 74 outputs the output signal to reset the flip-flop 71, whereby the switching element 11 is turned off and hence the discharge is stopped. As a result, the voltage Vout of the DC link 3 decreases. When the divided voltage, at the resistors R21, R22, of the voltage Vout of the DC link 3 decreases to equal to or below the reference voltage VrefL, the comparator 73 outputs the output signal to set the flip-flop 71 through the OR circuit 72, whereby the switching element 11 is tuned on and hence the discharging of the capacitor 9 is performed again. Subsequently, the above is repeated until the power running is finished. In this manner, the voltage at the DC link 3 is held below the regeneration start voltage during the power running, to thereby prohibit the start of regeneration operation.

Upon completion of the discharging, the controller 7 outputs a signal to turn on the transistor 76, thereby turning off the switching element 11.

The present invention deactivates the regeneration control function when the capacitor's power is discharged during the power running. Thus, there can be provided the motor driving apparatus having both the regeneration control function and the power storage device that comprises the capacitor for storing regenerative current and for discharging, during the power running, electric power stored in the capacitor.

What is claimed is:

1. A motor driving apparatus for driving an AC motor using a regenerative electric power as well as electric power from an AC power source, comprising:
   a converter section rectifying and converting an alternating current from the AC power source into a direct current;
   an inverter section, connected to an AC motor, converting the converted direct current into an alternating current to drive the AC motor;
   a DC link connecting said converter section and said inverter section;
   a power storage device, connected to said DC link, charging a capacitor with regenerative electric power in a decelerating drive of the AC motor and discharging the electric power stored in the capacitor to be supplied to said DC link in an accelerating drive of the AC motor; and regeneration control means for detecting a voltage of said DC link and feeding the regenerative electric power to the AC power source when the detected voltage of said DC link is equal to or higher than a regeneration control start voltage, said regeneration control means having regeneration control start voltage altering means for altering the regeneration control start voltage to avoid the regeneration control when the electric power stored in the capacitor is supplied to said DC link.

2. A motor driving apparatus for driving an AC motor using a regenerative electric power as well as electric power from an AC power source, comprising:

a converter section rectifying and converting an alternating current from the AC power source into a direct current;

an inverter section, connected to an AC motor, converting the converted direct current into an alternating current to drive the AC motor;

a DC link connecting said converter section and said inverter section;

a power storage device, connected to said DC link, charging a capacitor with regenerative electric power in a decelerating drive of the AC motor and discharging the electric power stored in the capacitor to be supplied to said DC link during an accelerating drive of the AC motor; and regeneration control means for detecting a voltage of said DC link and feeding the regenerative electric power to the AC power source when the detected voltage of said DC link is equal to or higher than a regeneration control start voltage, said regeneration control means having altering means for altering the regeneration control start voltage to be a voltage higher than a voltage of the electric power supplied from said power storage device to said DC link when said power storage device is connected to said DC link.

3. A motor driving apparatus according to claim 2, wherein means for operating said altering means for altering the regeneration control start voltage is provided at connecting means for connecting said power storage device to said DC link.

4. A motor driving apparatus for driving an AC motor using regenerative electric power as well as electric power from an AC power source, comprising:

a converter section rectifying and converting an alternating current from the AC power source into a direct current;

an inverter section, connected to an AC motor, converting the converted direct current into an alternating current to drive the AC motor;

a DC link connecting said converter section and said inverter section;

regeneration control means for detecting a voltage of said DC link and feeding the regenerative electric power to the AC power source when the detected voltage of said DC link is equal to or higher than a regeneration control start voltage; and a power storage device, connected to said DC link, charging a capacitor with regenerative electric power in a decelerating drive of the AC motor and discharging the electric power stored in the capacitor, said power storage device having electric power supply means for supplying the stored electric power to said DC link at a voltage lower than the regeneration control start voltage in an accelerating drive of the AC motor.

5. A motor driving apparatus according to claim 4, wherein said electric power supply means is constituted by a constant-voltage circuit for outputting a constant voltage.

6. A motor driving apparatus according to claim 5, wherein said constant-voltage circuit is constituted by a series regulator or a switching regulator.

7. A motor driving apparatus according to claim 4, wherein said electric power supply means comprises means for slowly increasing an output voltage at a start of discharging the stored electric power.

8. A motor driving apparatus according to claim 4, wherein said electric power supply means comprises a switching element supplying the electric power stored in said capacitor to said DC link and a control circuit controlling said switching element, and said control circuit detects the DC link voltage, controls said switching element to be turned off when the detected voltage is equal to or higher than a first set voltage lower than the regeneration control start voltage and controls said switching element to be turned on when the detected voltage is equal to or lower than a second set voltage which is lower than the first set voltage.

9. A motor driving apparatus according to claim 8, wherein said switching element is connected to said DC link through an inductance.

10. A method for driving an AC motor using regenerative electric power as well as electric power from an AC power source, comprising:

rectifying and converting an alternating current from the AC power source into a direct current;

converting the converted direct current into an alternating current to drive the AC motor;

connecting a converter section and a inverter section by a DC link;

charging a capacitor with regenerative electric power in a decelerating drive of the AC motor and discharging the electric power stored in the capacitor to be supplied to said DC link in an accelerating drive of the AC motor; and detecting a voltage of said DC link and feeding the regenerative electric power to the AC power source when the detected voltage of said DC link is equal to or higher than a regeneration control start voltage, and altering the regeneration control start voltage to avoid the regeneration control when the electric power stored in the capacitor is supplied to said DC link.

* * * * *

UNITED STATES PATENT AND TRADEMARK OFFICE
CERTIFICATE OF CORRECTION

PATENT NO. : 7,042,178 B2  Page 1 of 1
APPLICATION NO. : 10/859356
DATED : May 9, 2006
INVENTOR(S) : Yuuichi Yamada et al.

It is certified that error appears in the above-identified patent and that said Letters Patent is hereby corrected as shown below:

Column 1, line 14, change "ruining" to --running--

Column 10, line 1, change "VrefL" to --VrefH--

Signed and Sealed this

Twenty-third Day of January, 2007

JON W. DUDAS
*Director of the United States Patent and Trademark Office*